Feb. 17, 1942.      N. M. COUTY      2,273,396
SWIVEL HOSE FITTING
Filed April 5, 1941

INVENTOR
Norman M. Couty.
BY
ATTORNEY

Patented Feb. 17, 1942

2,273,396

UNITED STATES PATENT OFFICE 2,273,396

SWIVEL HOSE FITTING

Norman M. Couty, Detroit, Mich., assignor to The Flex-O-Tube Company, a corporation of Delaware Application April 5, 1941, Serial No. 386,979

1 Claim. (Cl. 285—97.5)

This invention relates to swivel couplings for flexible hose and the like.

This invention is an improvement over the invention disclosed and claimed in an application for patent, Serial No. 226,087 filed August 22, 1938, by Norman M. Couty, the applicant herein, which application has matured into U. S. Letters Patent No. 2,172,650 dated September 12, 1939 entitled Male swivel nut connection.

The prior art includes a fitting of the general type disclosed and claimed herein, however, when a fitting such as disclosed and claimed in the said Letters Patent No. 2,172,650 is placed under vacuum, initial compression on the compressible gasket employed is relieved, the fluid seal normally obtained is lost, and leakage results.

The primary object of the instant invention is to provide a fluid-tight swivel coupling usable under both pressure and vacuum which will allow hose or tubing to swivel or rotate with respect to the part to which it is coupled.

Another object of the invention is to provide a simple, inexpensive swivel coupling for connecting flexible hose and the like to a relatively fixed part which will permit the said hose to be used under alternate pressure and vacuum without leakage.

Other objects of the invention will become apparent by reference to the following detailed description taken in connection with the accompanying drawing, in which.

Figure 1:
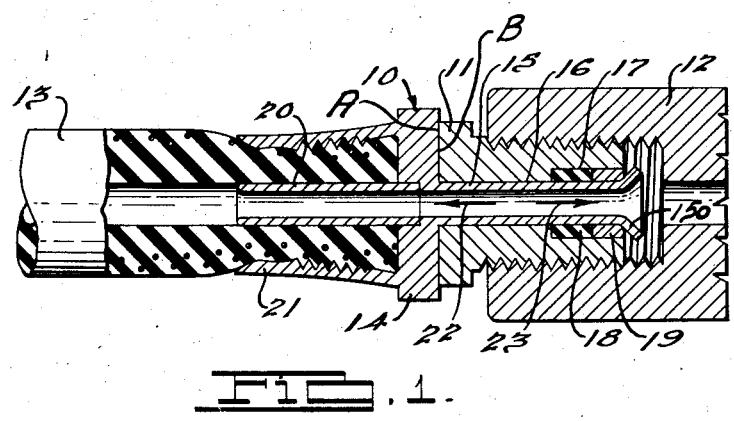
Fig. 1 is a longitudinal sectional view of a swivel fitting embodying the invention.

Referring now to the drawing wherein like numerals refer to like and corresponding parts throughout the several views, the swivel fitting 10 illustrative of the invention disclosed in Fig. 1 comprises a male nut 11 threadable into a part 12 to which the flexible hose or the like 13 is to be connected, the said flexible hose 13 has a coupling member 14 fixed thereon which has a tubular stem 15 extending therefrom through a suitable bore 16 in the said male nut 11. The tubular stem 15 of the coupling member 14 is sufficiently free within the bore 16 of the male nut 11 to permit the coupling member 14 and the flexible hose 13 to which it is connected to swivel with respect to the said male nut 11. The said male nut 11 is counterbored at 17 to accommodate a compressible annular washer or gasket 18 of rubber, neoprene or the like and to accommodate an annular metal sleeve or washer 19, the said compressible annular gasket 18 being disposed at the inner end of the said counterbore 17. The extreme end 150 of the tubular stem 15 of the coupling member 14 is flared or peened over to hold the swivel fitting 10 in assembled relationship and to initially compress the said compressible gasket 18 into sealed relationship between the tubular stem 15 and the male nut 11 at the counterbore 17.

Although the hose coupling member 14 is indicated as employing an inner tubular member 20 within the threaded and swedged shell 21 to prevent collapsing of the flexible hose 13 when the shell 21 of the coupling member 14 is swedged onto the said flexible hose 13, it is obvious that any type of coupling means other than that shown may be employed to connect the hose 13 to the coupling member 14.

Fluid under pressure within the fluid system to which the swivel fitting 10, the part 12 and the hose or the like 13 belong causes the hose coupling 14 and its tubular stem 15 to move in the direction indicated by the arrow 22 with respect to the male nut 11. This causes the metal washer 19 telescopingly fitted within the counterbore 17 to move axially against the compressible annular gasket 18 and further expand it within the counterbore 17 into increased sealed relationship between the said tubular stem 15 of the coupling member 14 and the male nut 11 whereby to provide a fluid-tight seal therebetween which becomes tighter as the pressure in the fluid system increases.

If the pressure within the fluid system to which the said swivel fitting 10, the part 12 and the hose or the like 13 belong is changed to a vacuum, then the hose coupling 14 and its tubular stem 15 are urged in the direction indicated by the arrow 23 with respect to the male nut 11. Because the end face A of the swivel fitting 10 and the end face B of the male nut 11 are normally in contact, the hose coupling 14 and its tubular stem 15 cannot move with respect to the male nut 11 when the fitting is under vacuum, and the seal created by the initial expansion of the compressible annular gasket 18 within the counterbore 17 is not adversely affected.

Figure 2:
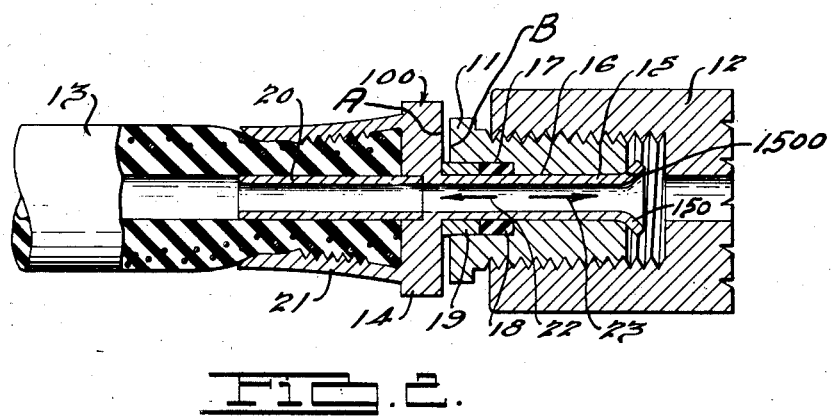
Fig. 2 is a longitudinal sectional view of a second embodiment of the invention similar to the swivel fitting disclosed in Fig. 1 but with its parts reversed.

The swivel fitting 100 disclosed in Fig. 2 is precisely the same as the swivel fitting 10 disclosed in Fig. 1 with the exception that the counterbore 17 is located in the opposite end of the male nut 11, the compressible washer 18 and annular metal sleeve or washer 19 located in the counterbore 17 are reversed, and the end face A of the swivel fitting 10 and the end face B of the male nut 11 are spaced.

Fluid under pressure within the fluid system to which the swivel fitting 100, the part 12 and the hose or the like 13 belong causes the hose coupling member 14 and its tubular stem 15 to move in the direction indicated by the arrow 22 with respect to the male nut 11. Because the peened over end 150 of the stem 15 of the hose coupling member 14 is tight against the end of the male nut 11, as indicated by the numeral 1500 in Fig. 2, the hose coupling member 14 and its tubular stem 15 cannot move with respect to the male nut 11 when the fitting is under pressure, and the seal created by the initial expansion of the compressible annular gasket 18 within the counterbore 17 is not adversely affected.

If fluid within the fluid system to which the said swivel fitting 100, the part 12 and the hose or the like 13 belong is changed to a vacuum, then the hose coupling member 14 and its tubular stem 15 are urged in the direction indicated by the arrow 23 with respect to the male nut 11. This causes the metal washer 19 telescopingly fitted within the counterbore 17 to move axially against the compressible annular gasket 18 and further expand it within the counterbore 17 into increased sealed relationship between the said tubular stem 15 of the coupling member 14 and the male nut 11 whereby to provide a fluid-tight seal therebetween which becomes tighter as the vacuum in the fluid system increases.

Hence, in fluid systems where both pressure and vacuum occur and the pressure is predominant, it is preferable to employ the embodiment of the invention disclosed in Fig. 1, and, in fluid systems where both pressure and vacuum occur and the vacuum is predominant, it is preferable to employ the embodiment of the invention disclosed in Fig. 2.

Although but two embodiments of the invention have been disclosed and described herein, it is obvious that many changes in the size, shape, arrangement and detail of the various elements thereof may be made without departing from the spirit and scope of the invention as defined by the appended claim.

I claim:

In a swivel coupling including a coupling member composed of a tubular stem, a nut having an axial bore therein telescoped over said tubular stem, the said nut having a counterbore therein at one end thereof, and a deformable annular gasket in said counterbore, means for sealing against alternate internal pressure and vacuum comprising an annular sleeve telescopingly mounted in said counterbore contacting the said annular gasket and extending axially outward from the counterbored end of said nut, and means for holding said coupling member, nut, annular gasket and annular sleeve in assembled relationship simultaneously with initial deformation of the said annular gasket within said counterbore.

NORMAN M. COUTY.